April 10, 1956             O. JUNKER             2,741,690
ELECTRIC INDUCTION HEATING PLANT AND A METHOD
OF CONNECTING IT TO A THREE-PHASE NETWORK
Filed Sept. 4, 1952

INVENTOR
Otto Junker
By
Young, Emery & Thompson
Attys.

United States Patent Office 2,741,690
Patented Apr. 10, 1956

2,741,690

ELECTRIC INDUCTION HEATING PLANT AND A METHOD OF CONNECTING IT TO A THREE-PHASE NETWORK

Otto Junker, Lammersdorf, near Aachen, Germany, assignor to Otto Junker, Lammersdorf, near Aachen, Germany, a firm Application September 4, 1952, Serial No. 307,790

Claims priority, application Germany September 6, 1951

1 Claim. (Cl. 219—10.75)

This invention relates to an electric induction heating plant for direct connection to a three phase network.

When connecting electric induction heating plants to three-phase mains unfavourable conditions arise due to the diameter and height of each coil when the induction heating coil is subdivided for the purpose of connecting it with the three phases.

According to the present invention subdivision of the coil for connection to different phases of the power supply is avoided and the entire coil which is capacitively compensated with respect to its load is connected only to one phase of the three-phase network and the load is compensated in the two other phases of the three-phase network by means of an inductive wattless load (reactors) and by a capacitive wattless load (condensers) in said both phases respectively. Thereby losses of energy in the total electrical plant as well as the required wattless power by employing electrical condensers are substantially less as when the subdivided inductive coils are directly connected to the three-phase network.

The drawing shows by way of example embodiments of the invention.

Figure 1:
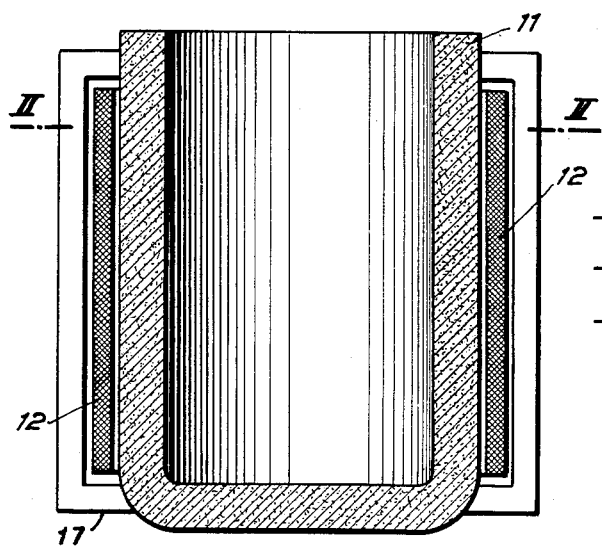
Fig. 1 is a cross section through a coreless electrical furnace to be heated by a three-phase network.
Figure 2:
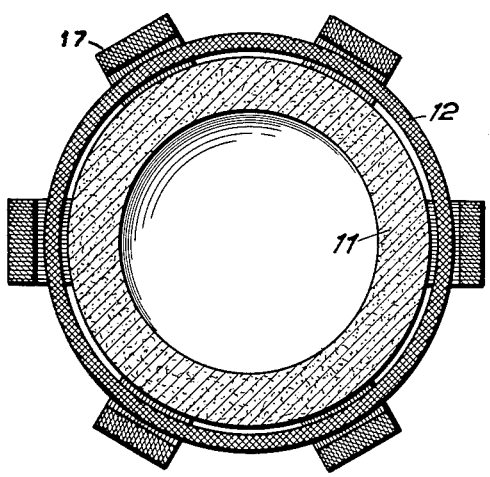
Fig. 2 is a horizontal cross section through Fig. 1 in the plane of the line 2—2.

In the drawing Figs. 1 and 2 illustrate a coreless electrical furnace comprising the crucible 11 and the heating coil 12. For the purpose of screening the coil 12 there is provided a plurality of transformer iron laminations 17 externally mounted as shown in Figs. 1 and 2. For melting a copper alloy having a specific electrical resistance $\rho=0.3$ ($\Omega$ mm.$^2$/m.) the inner diameter of the crucible will be about 25½" (65 cm.) and its height about 43½" (110 cm.). The diameter of the coil consisting of copper will be about 35" (89 cm.) and its height 43½" (110 cm.).

If in the prior art, the coil is subdivided into three sections each having a height of 14½" (36.7 cm.) and each being directly connected to one phase of the three-phase network, the coil has an electric transmitting efficiency of only 48.5% and a power factor $\cos \phi = 0.104$ so that, for compensating the power factor to $\cos \phi = 1.0$ a wattless power of 19.7 times of the useful output of the furnace is to be delivered by the electrical condensers.

According to the invention, the furnace coil is not sub-divided but the entire undivided coil is connected to one phase of the three-phase network. With a coil having a height of 43½" (110 cm.) the electrical efficiency is increased to 63.6% and the power factor $\cos \phi$ to 0.116. In this case the condenser power for compensating the power factor $\cos \phi$ to a value of $\cos \phi = 1$ amounts 13.4 times of the useful output of the plant.

To symmetrically distribute the fully compensated one phase furnace load over the three-phase network, according to the invention, a capacitive or inductive wattless load amounting to $$\frac{1}{\sqrt{3}}$$

of the output of the furnace is connected to the second and third phase respectively. Even by adding said capacitive auxiliary load the total wattless power of the condensers amounts only to 14.31 times of the useful output of the furnace, i. e. 38% less than with a three-phase connection of the furnace coil. While the reactance coil required in the third phase as an inductive load diminishes the efficiency of the whole by about 2.5% due to its relatively higher losses, the efficiency of the electrical transmission remains higher by 12.5% than with the connection of a subdivided coil to the three phases. Additionally the costs of installation and maintenance with the reactance coil are considerably lower as when using expensive condensers related to the unity of output.

Preferably the invention is employed in a range wherein as in the prior art with a subdivision of the heating coil into two or more separately connected sections each connected to a different phase of the power supply, the electrical efficiency of energy transmission $\eta$ and the phase difference angle $\phi$ would change according to the formula $$\frac{\operatorname{tg} \phi_2}{\eta_2} \geq 0.7 \cdot \frac{\operatorname{tg} \phi_1 + \frac{1}{\sqrt{3}}}{\eta_1}$$

wherein the index 1 relates to the whole monophase connected coil and the index 2 to the subdivided multiphase coil section.

Figure 3:
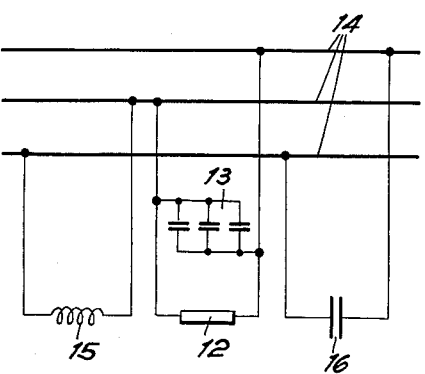
Fig. 3 shows diagrammatically the connection of the furnace, the reactor and the condenser to the three-phase network, if delta connection is used
Figure 4:
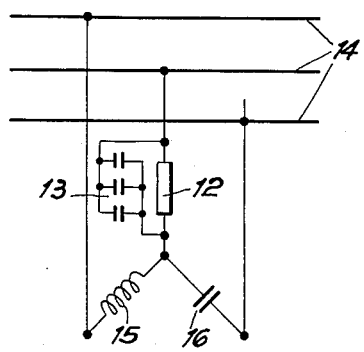
Fig. 4 is a similar illustration with star connection.

Figs. 3 and 4 are diagrams of circuit connections in delta star connections respectively. In both of these figures 12 indicates the heating coil which is capacitively compensated by condensers 13. The heating coil is connected to one phase of the three-phase network 14 while the two other phases are connected one with a reactance coil 15 and the other with a condenser 16.

The connection of the heating coil according to the invention for instance is advantageously applied in coreless induction melting furnaces—particularly with non-conducting crucibles—in which by damping of the movement of the charge inside the crucible the height of the coil will be reduced in the well known manner to such a degree that the upper edge of the coil will remain below the level of the charge. The reduction of the height in case of subdivided coil sometimes is difficult or impossible particularly on account of the adherent unfavourable relation between dimensions of the coil and electrical transmitting efficiency. The height of the coil may be lower without so great efficiency losses when one-phase connection and undivided coil will be used according to the invention.

Of course instead of a geometrical undivided coil a subdivided coil which is connected electrically by series-connection or by parallel-connection may be provided as well.

What I claim is:

Coreless induction furnace for direct connection to a three phase network comprising a heating coil which is undivided and connected to only one phase of the said network, capacitive means associated with said heating coil for compensating its load, and means for providing symmetrical load distribution within the three phases, said last-mentioned means consisting of an inductive wattless load in another phase and a capacitive wattless load in the third phase of said network, and in which the ratio of the height to the diameter of the heating coil is of such geometrical range that with a subdivision of the heating coil into at least two separately connected sections the electrical efficiency of energy transmission $\eta$ and the phase difference angle changes according to the formula, $$\frac{\tan \phi_2}{\eta_2} \geq 0.7 \cdot \frac{\tan \phi_1 + \frac{1}{\sqrt{3}}}{\eta_1}$$

wherein the index 1 relates to the entire coil and the index 2 to the subdivided coil section.

References Cited in the file of this patent

UNITED STATES PATENTS

| | | |
|---|---|---|
| 2,359,768 | Kiltie | Oct. 10, 1944 |

FOREIGN PATENTS

| | | |
|---|---|---|
| 512,738 | Great Britain | Sept. 25, 1939 |
| 613,901 | Great Britain | May 9, 1935 |
| 671,310 | Great Britain | Apr. 30, 1952 |
| 679,127 | Great Britain | Sept. 10, 1952 |
| 778,775 | France | Mar. 23, 1935 |